UNITED STATES PATENT OFFICE.

LOUIS CHARLES BONNEAU, OF ST. DENIS, AND VICTOR EMILE HASENFRATZ, OF LEVALLOIS-PERRET, FRANCE.

TREATMENT OF THE RESIDUE FROM GAS PURIFICATION KNOWN AS CRUDE AMMONIAC.

1,253,571.     Specification of Letters Patent.     Patented Jan. 15, 1918.

No Drawing.     Application filed April 21, 1914. Serial No. 833,471.

*To all whom it may concern:*

Be it known that we, LOUIS CHARLES BONNEAU and VICTOR EMILE HASENFRATZ, citizens of the Republic of France, and residents of, the former, 19 Rue de la Légion d'Honneur, St. Denis, Seine, and the latter, 53 Rue Vallier, Levallois-Perret, Seine, in the said Republic, both chemists, have invented a new and useful Treatment of the Residue from Gas Purification Known as Crude Ammoniac, of which the following is a specification.

This invention relates to systematic process for obtaining by chemical reactions all the products or by-products contained in the residue from gas purification known as crude ammoniac. The term "crude ammoniac" is intended to cover materials which have served for the purification of illuminating gas and which may be of two kinds: first, the Laming mixture, composed of sulfate of iron, chalk and sawdust; and second, oxid of iron.

In processes hitherto used there has been extracted from the crude ammoniac either the sulfur to the exclusion of the other products or the Prussian blue, but no industrial process has been available for extracting concurrently all the useful constituents of this material.

The process forming the subject matter of this invention comprises four successive operations which, owing to the solvent selected, to the efficacy of the reactions used for the separations, and finally to the order adopted in introducing the agents, reduce to a minimum the waste of each operation and extract practically the whole of the matters contained in the crude material. These operations follow one another in this order:—

1. Desiccation of the crude material.
2. Extraction of sulfur.
3. Extraction of ammoniacal salts.
4. Preparation of Prussian blue.

1. *Desiccation of the crude material.*

This material contains a small proportion of free ammonia (0–2 per cent.) which ought not to be lost. The first operation, therefore, is to dry the material under conditions for condensing and recovering the water evolved. The material is heated, for example by indirect steam, the mass being stirred the while. The steam and free ammonia expelled are suitably collected and condensed.

This preliminary drying operation may be omitted without affecting the succeeding operations.

2. *Extraction of sulfur.*

The sulfur is extracted by dissolution in a solvent of the chlorinated or chlorid class of a non-inflammable kind, such as for instance trichlor-ethylene. The crude mass is lixiviated progressively by the boiling solvent which thus extracts the sulfur which is subsequently recovered by evaporating the solvent.

The sulfur may also be extracted by diffusion, it being then recovered by crystallization, preferably followed by distillation for recovering the sulfur still contained in solution in the solvent.

In either case after the sulfur has been liberated the vapor of the solvent is condensed and the liquid thus obtained is reserved for further operation.

3. *Extraction of the ammoniacal salts.*

The residue from the de-sulfurizing operation is leached with tepid water to which should be added the slightly ammoniacal condensed water derived from the preliminary desiccation. When the extraction is judged to be sufficient the liquid containing the ammoniacal salts is treated with lime to liberate the ammonia which is recovered either as a aqueous solution or as a suitable ammoniacal salt by absorption with the necessary acid in known manner.

It is preferable to use lime in the form of milk of lime for treating directly the crude mass after desulfurization; this mode of operation has the two-fold effect of liberating the ammoniacal nitrogen and rendering soluble the ferro-cyanids by transforming the impure and insoluble ferro-cyanid of iron into the soluble calcium ferro-cyanid.

4. *Extraction of the Prussian blue.*

When the preceding treatment has been effected with lime, the solid residue from the treatment is mixed with water and slaked lime. The mass is then heated to about 100° C. by means of a current of steam. Under the action of the lime the ferric ferro-cyanid or Prussian blue contained in the crude mass is transformed into the soluble calcium ferro-cyanid.

The crude leached mass containing the calcium ferro-cyanid in solution, obtained either in the manner last described or in that previously described directly the ammonia has been liberated, is decanted so as to separate the liquid from the insoluble portion. The solution is then boiled, for example by steam and there is added potassium chlorid. A crystalline precipitate of the double ferro-cyanid of calcium and potassium which is very little soluble in water soon appears and as it is of a specific gravity decidedly higher than that of the liquid it settles rapidly. After cooling, the liquid is siphoned from the precipitate, which is then washed with cold water and decanted. Water is then added and the mixture heated to boiling and treated with slight excess of sodium carbonate. The double ferro-cyanid of calcium and potassium is thus decomposed with precipitation of insoluble calcium carbonate and formation of an alkaline ferro-cyanid (double ferro-cyanid of potassium and sodium) which remains dissolved. After cooling, the liquid is separated by decantation from the precipitate.

This liquid is then poured into a solution of a ferric salt, whereupon an abundant precipitate is formed which is preferably per-oxidized, for example by means of pure sodium hypochlorite or by hydrogen peroxid, so as to obtain Prussian blue. This latter is suitably washed and decanted, then dried. The Prussian blue is finally passed through the stove at a temperature of 30°–35° C. and may be at the same time subjected to the action of a vacuum.

The final solid residue from the crude material contains a suitable proportion of oxid of iron so that the waste from the manufacture has still a commercial value from the point of view of the possible utilization of the iron.

Having thus described our invention and the best means we know of carrying the same into practical effect, we claim:—

1. A process for the total extraction of the industrial chemical products contained in the residue from gas purification known as crude ammoniac, which process consists in first extracting the sulfur by means of a solvent of the class of non-inflammable chlorinated or chlorid solvents, then driving out the ammoniacal nitrogen by means of lime, then rendering soluble the ferro-cyanid by means of milk of lime, then treating the solution successively with potassium chlorid and sodium carbonate for the purpose of rendering the ferro-cyanid in the first instance insoluble, and then soluble in order to separate it from foreign materials, then precipitating the ferro-cyanid by a ferric salt and finally peroxidizing the precipitate obtained to transform it into Prussian blue.

2. A process for the total extraction of the industrial chemical products, contained in crude ammoniac, which process consists in first extracting sulfur from the crude mass by systematic extraction by a boiling solvent of the class of non-inflammable chlorinated or chlorid solvents, then evaporating the solvent for liberating the sulfur, then driving out the ammoniacal nitrogen by means of lime, then rendering soluble the ferro-cyanid by milk of lime, then treating the solution successively with potassium chlorid and sodium carbonate with the object of first rendering the ferro-cyanid insoluble and then soluble so as to separate it from foreign materials, then precipitating the ferro-cyanid by means of a ferric salt and finally peroxidizing the precipitate to transform it into Prussian blue.

3. Process for the total extraction of industrial chemical products from crude ammoniac, which consists in first desiccating the crude mass in order to recover the free ammonia, then extracting the sulfur by means of a solvent of the class of non-inflammable chlorinated or chlorid solvents, then driving out the ammoniacal nitrogen by means of lime, then rendering soluble the ferro-cyanid by milk of lime, then treating successively the ferro-cyanid solution with potassium chlorid and sodium carbonate for the purpose of first rendering insoluble and then soluble the ferro-cyanid so as to separate it from foreign materials, then precipitating the ferro-cyanid by means of a ferric salt and finally peroxidizing the precipitate to transform it into Prussian blue.

4. A process for the total extraction of industrial chemical products contained in crude ammoniac, which process consists in extracting the sulfur by means of boiling trichlorethylene for dissolving the sulfur; then driving out the ammoniacal nitrogen by means of lime, then rendering soluble the ferro-cyanid by milk of lime, then treating successively the ferro-cyanid by potassium chlorid and sodium carbonate so as to first render the ferro-cyanid insoluble and then soluble so as to separate from it the foreign materials, then precipitating the ferro-cyanid by a ferric salt and finally peroxidizing the precipitate to transform it into Prussian blue.

5. A process for the total extraction of industrial chemical products contained in crude ammoniac, which process consists in first extracting the sulfur by means of a solvent of the class of non-inflammable chlorinated or chlorid solvents, then driving out the ammoniacal nitrogen by means of lime, then rendering soluble the ferro-cyanid by milk of lime, then treating successively the ferro-cyanid with potassium chlorid and sodium carbonate so as to render it first insoluble and then soluble in order to separate it from foreign materials, then precipitating the ferro-cyanid by means of a ferric salt, then peroxidizing this precipitate by hydrogen peroxid and finally washing and decanting the Prussian blue obtained and drying it.

In testimony, that we claim the foregoing as our invention, we have signed our names in presence of two witnesses, this 9th day of April, 1914.

LOUIS CHARLES BONNEAU.
VICTOR EMILE HASENFRATZ.

Witnesses:
CHAS. P. PRESSLY,
ALCIDE FABRE.